July 4, 1972   M. S. SENDOR   3,674,399
APPARATUS FOR MAKING PLASTIC BOOK COVERS
Filed Aug. 13, 1970
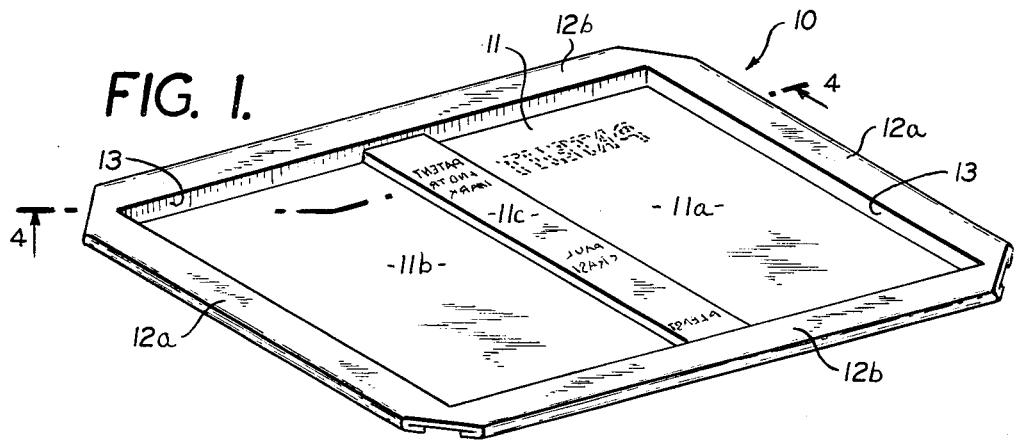
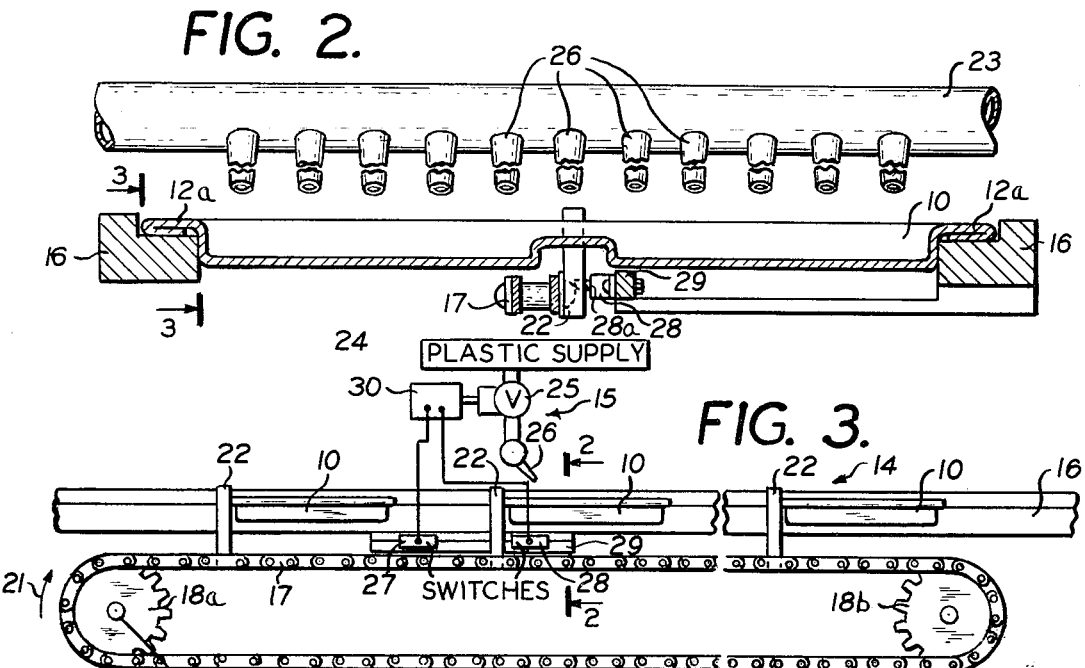
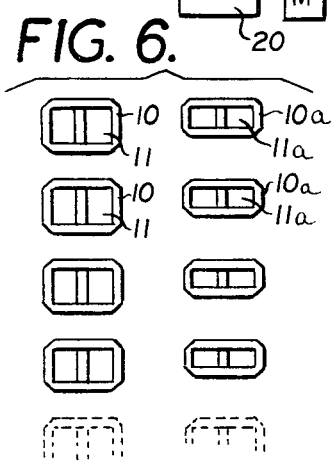
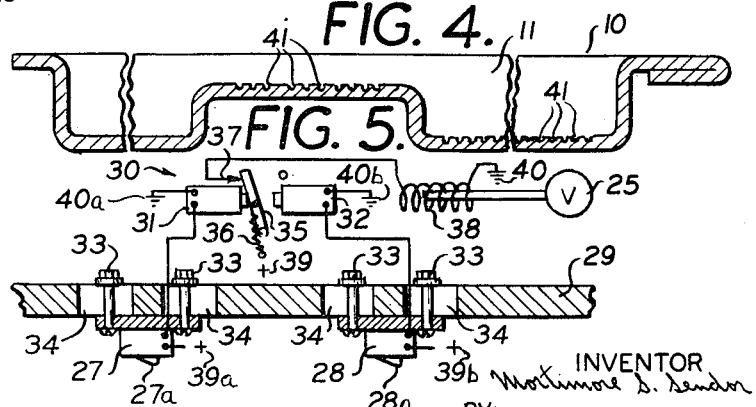
INVENTOR
Mortimore S. Sendor
BY Sandoe, Hopgood
& Calimafde.
ATTORNEYS.

United States Patent Office 3,674,399
Patented July 4, 1972

3,674,399
APPARATUS FOR MAKING PLASTIC BOOK COVERS
Mortimer S. Sendor, Queens Village, N.Y., assignor to Bookwrights, Inc., New York, N.Y.
Filed Aug. 13, 1970, Ser. No. 63,395
Int. Cl. B29c 5/00
U.S. Cl. 425—166                    11 Claims

ABSTRACT OF THE DISCLOSURE

Individually plastic book covers are molded in novel sheet metal molds of simple and inexpensive construction shaped to cast a book cover with stiff front and back panels and with a thin portion for flexibility where the front and back panels have to hinge to open and close the book. The bottoms of the mold cavities may be given contours for molding decorations and/or legends, as desired, into the outside surfaces of the covers. The molds are shaped to stay in line as successive molds are pushed along a guide track by lug on an endless chain, and there are automatic controls for stopping and starting the flow of plastic at a mold filling station.

---

The present invention is apparatus for molding plastic book covers in which the front and back covers and the intermediate backbone are all molded in one piece with hinge lines between. Decorations and/or inscriptions or legends may also be molded in.

Principal objects of this invention are to provide simple, easily formed molds for molding one-piece book covers of plastic and apparatus for carrying out the molding process effectively and inexpensively at a rapid rate of production.

SUMMARY OF THE INVENTION

In accordance with the invention the individual book covers are molded of plastic which is poured into open top pan molds as a succession of the molds are carried past a filling station by a conveyor. The individual pan molds are supported on the conveyor by flanged side edges resting on, and riding on, guide rails of the conveyor; the pan molds are moved along the conveyor by a rotating endless chain belt which has lugs engaging rear edges of the pan molds on the conveyor. The widths of different pan molds are the same in order to be supported on the conveyor, but the cavities of different molds are suitably made in different dimensions and configurations for books of different sizes. The filling station consists of a line of nozzles transversely of the conveyor and switch means is operable to start the flow of plastic from the nozzles as the front or downstream edge of a pan mold cavity moves in under the nozzles and to stop the flow as the rear or upstream edge of the cavity approaches the nozzles.

The pan molds are simple and relatively inexpensive, preferably being made of thin sheet material, such as aluminum sheet, into which the mold cavity is readily stamped and which is easily bendable so that the edges of the sheet can be doubled over to increase the strength and rigidity of the pan molds.

BRIEF DESCRIPTION OF THE DRAWINGS

The invention will now be described with reference to an illustrative embodiment shown in the accompanying drawings in which:

FIG. 1 is an isometric view of a pan mold of this invention;

FIG. 2 is a view, partly in section, transversely through the conveyor of the apparatus of this invention, the view being taken along the line 2—2 of FIG. 3 looking upstream of the conveyor toward the filling station of which the nozzles and part of the header are shown in elevation;

FIG. 3 is a view longitudinally through the conveyor along the line 3—3 of FIG. 2, showing a succession of molds in side elevation on the conveyor and showing schematically the filling station and controls therefor, and the motor for the conveyor;

FIG. 4 is a cross-sectional view along the line 4—4 of FIG. 1;

FIG. 5 is a sectional view through a frame member of the conveyor showing the mounting of control switches for the filling station, and illustrating schematically the control circuitry for the filling station; and FIG. 6 is a top plan view of two alternative rows of pan molds as they would be aligned respectively on the conveyor, the molds in one row having a cavity configuration different from the cavity configuration of the molds of the other row.

DESCRIPTION OF PREFERRED EMBODIMENT

Referring to the drawings a mold 10 for use in combination with the apparatus of this invention is a generally flat pan having a mold cavity 11 impressed therein. For forming a book cover having stiff front and back covers and an intermediate backbone portion connected so that the covers can swing relative to the backbone for opening and closing the book, the mold cavity is formed with two relatively deep portions 11a and 11b, for forming the front and back covers respectively, and a shallower intermediate portion 11c for forming the backbone. The relative depths are selected so that plastic poured into the mold forms stiff front and back covers, and a flexible backbone, the lines of demarkation between the edges of the covers and the backbone being fold lines along which the covers hinge on the backbone.

Alternatively the mold cavity 11 could be formed with the portions 11a, 11b and 11c all the same depth—so that the front and back covers and the backbone would each be stiff—with a ridge or rib projecting up from the bottom of the cavity at each opposite side edge of the backbone-forming central portion 11c of the cavity to provide indented parallel lines in the molded cover defining fold lines for the covers.

The mold 10 is preferably formed of thin sheet metal, such as polished aluminum, into which a mold cavity 11 of the desired depth and configuration can be formed by stamping and which is bendable so that the edge portions of the sheet can readily be bent double. When the cavity 11 is stamped into the sheet, the peripheral portions of the sheet are in the form of outwardly extending flange portions which are then doubled over as indicated in FIG. 1 to provide pairs of flanges 12a and 12b respectively at opposite side edges of the mold. Though the mold 10 is formed of thin sheet, the downwardly extending side walls 13 of the mold cavity 11 and the double-thickness flanges 12a and 12b around the mold provide structural strength to hold the mold against sagging as it is supported by the flanges 12a on the casting apparatus as described below.

Referring to FIGS. 2 and 3 the casting apparatus in accordance with the invention includes a conveyor 14 (FIG. 3), on which a sequence of molds 10 are supported, and a filling station 15 adjacent a portion of the conveyor for pouring plastic molding composition, such as a plastisol, into succesive mold cavities 11 as the molds are carried past.

The conveyor 14 has a pair of guide rails 16 which are spaced apart for supporting the molds 10 between them. Each rail has an undercut surface portion 16a and the rails are spaced apart so that flanges 12a at opposite side edges of the molds 10 rest on and slide along the rails on the surface portions 16 as indicated in FIG. 2.

The molds 10 are moved along on the guide rails 16 by an endless chain belt 17 which is mounted below and between the rails. The belt 17 is carried around sprockets 18a and 18b and is rotated by a motor 19 which is connected through a conventional drive connection, indicated at 20, to drive the sprocket 18a and chain belt 17 in the direction indicated by the arrow 21. A plurality of lugs 22 are mounted on the belt 17 at spaced intervals therealong to project outward so that, along the upper run of the belt 17, the lugs 22 project upward respectively to engage the rear, or upstream flanges 12b of successive molds 10, which are placed on the guide rails 16 at the upstream end (the left end in FIG. 3) of the conveyor 14, and thus to move the molds along the rails.

The filling station 15 is arranged above the conveyor 14 and includes a header 23 extending across the conveyor and connected to receive a molding composition, such as a plastisol in plastic condition from a suitable source of supply indicated at 24. The source of supply 24 may suitably be a conventional type consisting of a hopper into which a plastisol is placed, a heater for initiating the plasticizing of the plastisol and for rendering it plastic and flowable, and means, such as a rotating worm, for flowing the plastic to the header 23 through a suitable conduit. A solenoid valve 25 is provided between the supply 24 and the header 23 for controlling the flow of plastic into the header.

A row of nozzles 26 in the header are spaced along it to be over the width of the mold cavity 11 of a mold carried under the header 23 by the conveyor 14.

Control mechanism for actuating the solenoid valve 25 to let plastic flow into the header 23 and through the nozzles 26 in timed relation with the movement of molds 10 along the conveyor is illustrated in FIGS. 3 and 5. This mechanism suitably includes a pair of limit switches 27 and 28 which are mounted on a frame member 29 of the conveyor 14 and which are connected to be actuated by the lugs 22 on the belt 17 to operate the solenoid valve 25 through a switching device 30 (FIG. 3) consisting of a pair of relays 31 and 32 (FIG. 5).

As indicated, the switches 27 and 28 have movable switch levers 27a and 28a for actuating them by pressure on the levers and they are mounted on the frame member 29 for the levers 27a and 27b to be pressed in and then released by a lug 22 on the belt 17 as the movement of the belt carries successive lugs 22 past them. This is illustrated in FIG. 2 which shows the position of a lug 22 on the upper run of belt 17 relative to the lever 28a of the downstream switch 28.

As shown in FIG. 5 the switches 27 and 28 are mounted the frame member 29 by bolts 33 through slots 34 in the member and the slots are elongated in the longitudinal direction of the conveyor for adjusting the positions of the switches relative to the position of the nozzles 26 of the filling station 15. Thus the upstream switch 27 is located in position to be actuated by a lug 22 to open the solenoid valve 25 for starting a flow of plastic to the nozzles 26 as the mold cavity 11 of a mold 10 pushed by that lug begins to move in under the row of nozzles. The downstream switch 28 is located to be actuated subsequently by the same lug as the lug moves downstream, to close the solenoid valve 25 and shut off the flow of plastic to the mold as the rearward, upstream end of the mold cavity approaches the row of nozzles.

The switching device 30 through which switches 27 and 28 are connected to open and close the solenoid valve 25 consists of a relay 31 coupled to the upstream switch 27 facing and spaced from a relay 32 which is coupled to the downstream switch 28. A contact arm 35 is pivotally mounted between the relays to be drawn to one or the other of the relays 31 or 32 when one or the other relay is actuated and is biased by a spring 36 to remain in position toward one or the other of the relays, to which position it is pivotted by actuation of one of the relays, until it is subsequently pivotted toward the other relay by actuation of the latter relay.

When the contact arm 35 is drawn to the relay 31, when the latter is energized by the actuation the upstream switch 27 by a lug 22 on the belt 17, the upper end of the contact arm engages a contact 37 of the coil 38 of the solenoid valve 25 to actuate, and open, the valve 25 by closing an electric circuit through spring 36, contact arm 35, contact 37 and coil 38. The power source for the latter circuit and for switches 27 and 28 and relays 31 and 32 are indicated by positive terminals 39a associated with switch 27, and 39b associated with switch 28 and by ground terminals 40a associated with relay 31, and 40b associated with relay 32. The circuit of the solenoid coil 38 includes a terminal 39 at one end of spring 36 and a grounded terminal 40.

As previously mentioned, the switches 27 and 28, and hence the relays 31 and 32, are actuated only momentarily by the momentary depressing of the switch levers 27a and 28a by the movement of lugs 22 on belt 17 past the switches. Thus it will be seen that momentary actuation of upstream switch 27 and relay 31 pivots the contact arm 37 to the position in which it causes the solenoid valve 25 to open for plastic to flow to nozzles 36, and that spring 36 holds the contact arm 37 in position for keeping the valve 25 open until the downstream switch 28 and relay 32 are momentarily actuated to pivot the contact 35 so as to open the circuit through solenoid coil 38 and cause the valve 25 to close and shut off the flow of plastic. Thereafter, the spring 36 holds the contact arm 35 in the position, in which valve 25 remains closed, until the upstream switch 27 is again actuated by a successive lug 22 moving past the switch 27 to push a successive mold 10 in under the nozzles 26.

The conveyor 14 is preferably made long enough from the filling station 15 to its downstream end so that plastic material filled into the molds 10 will be substantially hardened by the time the molds reach the downstream end where they are removed, or automatically dumped from the conveyor. The book covers thus formed by the mold cavities 11 are subsequently removed from the molds, which may then be replaced on the upstream end of the conveyor to be filled again.

As illustrated in FIG. 6 the molds 10 and/or the mold cavities 11 may be made different dimensions for making different size book covers. FIG. 6 shows a sequence of molds 10 of one size and an alternative sequence of molds 10a of a different size, to provide mold cavities 11 and 11a of respectively different sizes. The molds of different sizes have the same widths in order to be supported between the rails 16 of the conveyor 15, but their upstream-downstream lengths may be varied as indicated by the shorter lengths of the molds 10a. When the apparatus is set up for a successive molding run with molds having mold cavities longer or shorter than the mold cavities of the molds used for the previous run, the positions of the limit switches 27 and/or 28 will be readjusted to accommodate the initiation and duration of the flow of plastic from nozzles 26 to the new mold cavity size.

The spacing between the molds on the conveyor is determined by the spacing of the lugs 22 along the belt 17 and the lugs may advantageously be removably or pivotally mounted on the belt so that the number and spacing of the lugs can be varied by adding or removing lugs, or by pivotting them to project from the belt or to lie flat in the plane of the belt so as to pass by the switches 27 and 28 without engaging the switch arms 27a and 28a.

Within the above limitation of the widths of the molds 10 to span the space between the rails 16, the area, the depth and the configuration of the mold cavities 11 may be designed within wide limits for producing book covers of the desired size. Also, as previously mentioned, and as illustrated in FIGS. 1 and 4, the mold cavity 11 may have designs and/or legends, such as a title, the author's or editor's name, and the publisher's name, inscribed therein to be reproduced in either raised or undercut form on the final cover. FIG. 4 shows lines engraved or stamped into the bottom surface of the mold cavity for forming raised letters or decorations on the cover molded therein.

The mold and molding apparatus of this invention thus makes it possible to form molds of the desired configuration and design simply and inexpensively. The structure of the molds and molding apparatus enables the apparatus to be set up quickly for molding a desired number of book covers of one size and then, in a very short time and with very little readjustment, to substitute molds of a different size for molding a desired number of book covers of the latter size. In addition, the apparatus is relatively simple and is economical to construct and maintain and is easy to operate.

What is claimed is:

1. Apparatus for making plastic book covers including in combination a conveyor having means for holding a plurality of molds, said means being a guide comprising a track with rails at opposite sides of the molds and on which the molds rest, each of the molds fitting into the guide and the guide holding the molds against movement transverse of the direction of travel of the mold, each of the molds being independent of similar molds of a set and having a cavity of the size of the desired cover with a raised wall of each mold in position to produce a lesser thickness of the cover at the parts of the cover that are at opposite sides of the backbone of a book to which the cover is to be applied, whereby said parts of the cover provide hinge lines for front and back panels of the cover, means for advancing the molds along the length of the conveyor including an endless belt with separate projections spaced from one another by a distance greater than the length of each mold for pushing each mold along the guide, and for pushing replacement molds of less length for molding smaller covers, and a filling station for the molds at an upstream location along the conveyor.

2. The apparatus described in claim 1 characterized by a plastic supply device at the filling station for discharging a measured quantity of plastic into each successive mold while the mold is at the filling station, and automatic means responsive to the arrival of successive molds at the filling station for guiding the plastic supply device to fill each mold.

3. The apparatus described in claim 2 characterized by confronting generally vertical surfaces of the rails and molds for holding the molds against transverse movement.

4. The apparatus described in claim 3 characterized by each of the molds being an open top mold made of sheet metal with transversely extending flanges forming both of the side edges thereof, and with the sheet metal depressed between said flanges to form the cavity of the mold, the depression being of less depth at the region of the cavity corresponding to the parts of the cover that are to provide hinges for the front and back panel of the cover.

5. The apparatus described in claim 4 characterized by each of the molds having flanges around the entire perimeter of the mold and the sheet metal being folded back to give the flanges twice the thickness of the sheet metal, said sheet metal extending down from the flanges to form sides of the mold cavity and extending across the bottom of the cavity to produce a one-piece mold with the double thickness of the flanges and the downwardly extending side walls of the cavity providing the structural strength to hold the mold against sagging as it spans the distance between the rails with the bottom of the mold in a horizontal plane whereby molten plastic placed in the mold at the filling station distributes itself to a uniform depth across the surfaces of the mold that mold the front and back panels of the cover.

6. The apparatus described in claim 2 characterized by the molds being free of any connection to the conveyor, and there being a set of molds having at least as many molds as the conveyor transports during the time required for the plastic in a mold to solidify to a state at which it can be safely removed from the mold, and another set of molds for use with the conveyor and filling station, the other set of molds having cavities of different size from the first set of molds for making covers of different size, and means for adjusting the automatic means to change the quantity of plastic delivered to each mold.

7. The apparatus described in claim 6 and in which the different sets of molds are of different length but of substantially the same width to fit the guide of the conveyor, but the cavities of the mold are of different size and all of the molds of one set having contours on the mold for producing letters on the outside of the cover identifying the book to which the cover is to be applied, and all of the molds of the other set having contours on the mold for producing legends on the cover identifying the book on which the covers of said other set of molds are to be used.

8. The apparatus described in claim 1 characterized by each of the molds being an open top tray, the plastic supply device including automatic means responsive to the arrival of each successive mold at the filling station for delivering a predetermined quantity of plastic to the mold, and means for adjusting the automatic means to change the quantity of plastic delivered to each mold.

9. The apparatus described in claim 8 characterized by the plastic supply device including a header and a plurality of discharge nozzles at spaced locations along the header and transverse of the direction of movement of the mold to initially spread the plastic across the area of the mold cavity, the means for advancing the molds having continuous operation whereby each mold moves continuously as it is filled at said filling station.

10. The apparatus described in claim 9 characterized by controls on the conveyor correlated with the positions of said spaced projections that advance the molds along the conveyor for starting the discharge of the filling nozzles after the leading side of a mold cavity has passed the nozzles, and the automatic means for delivering a predetermined quantity of plastic being timed with respect to the speed of the conveyor and the upstream-downstream length of the mold cavity to cut off the flow of plastic before the upstream end of the cavity reaches the nozzles.

11. The apparatus described in claim 6 characterized by each set of molds having a mold cavity of different size for making a cover of different size, but all of the molds of both sets being of the same width whereby they fit within the guide by which the molds are held against transverse movement as they advance along the length of the conveyor.

References Cited
UNITED STATES PATENTS

| | | | |
|---|---|---|---|
| 3,226,764 | 1/1966 | Hostettler | 18—4 C |
| 1,803,886 | 5/1931 | Ausman | 18—26 R UX |
| 3,040,381 | 6/1962 | Pioch | 18—4 CX |
| 3,197,531 | 7/1965 | Wilbur | 18—4 C UX |

H. A. KILBY, JR., Primary Examiner

U.S. Cl. X.R.

425—257, 182, 453